United States Patent [19]

Saigo et al.

[11] Patent Number: 4,573,121
[45] Date of Patent: Feb. 25, 1986

[54] METHOD FOR DETERMINING OPTIMUM THICKNESS OF OPHTHALMIC LENS

[75] Inventors: Tsuyoshi Saigo, Tokyo; Akira Kitani, Fussa, both of Japan

[73] Assignee: Hoya Lens Corporation, Tokyo, Japan

[21] Appl. No.: 501,711

[22] Filed: Jun. 6, 1983

[30] Foreign Application Priority Data

Sep. 24, 1982 [JP] Japan .................. 57-165118

[51] Int. Cl.$^4$ .................. G02C 7/02; G02C 13/00
[52] U.S. Cl. .................. 364/413; 33/174 A; 51/284 R; 351/178
[58] Field of Search .......... 51/284 R, 105 LG, 124 L; 350/417; 351/159, 177, 178; 33/174 A; 364/413

[56] References Cited

U.S. PATENT DOCUMENTS 3,740,857  6/1973  Nerad .................. 33/174 A
4,299,032  11/1981 Young .................. 33/174 A

FOREIGN PATENT DOCUMENTS 0061918 10/1982 European Pat. Off. ............ 351/178
2375617  7/1978 France.

OTHER PUBLICATIONS

Jalie, M. "The Thickness of Spectacle Lenses", *The Optician*, vol. 152, Nos. 3936 thru 3943, Sep. thru Oct. 1966,. 6 Part Series.

*Primary Examiner*—Jerry Smith
*Assistant Examiner*—Clark A. Jablon
*Attorney, Agent, or Firm*—Bert J. Lewen; Henry Sternberg

[57] ABSTRACT

A method for determining the optimum thickness of an ophthalmic lens comprises the steps of applying data indicative of the kind of a lens suitable for a spectacle wearer and the contents of a prescription as inputs to a computer, executing necessary computation by the computer according to a predetermined program on the basis of the various input data thereby drawing a map of an equi-thickness line group of the ophthalmic lens on the basis of the result of computation, and placing a spectacle frame at a predetermined position on the map of the equi-thickness line group to find out the outermost equi-thickness line within the extent of the frame.

4 Claims, 6 Drawing Figures

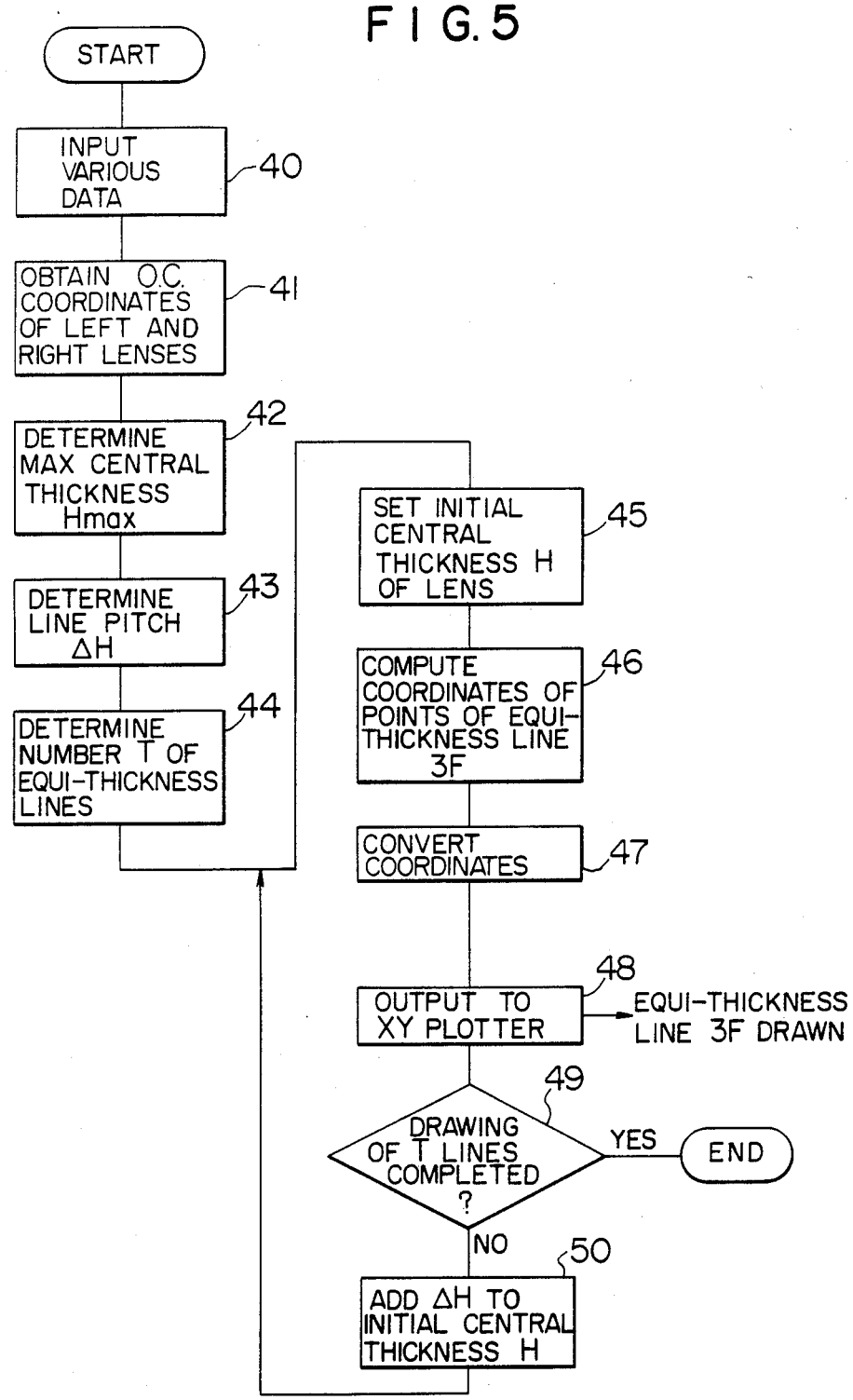

METHOD FOR DETERMINING OPTIMUM THICKNESS OF OPHTHALMIC LENS

This invention relates to a method for determining the optimum thickness of ophthalmic lenses. The invention relates also to selection of a spectacle frame suitable for mounting of lenses whose optimum thickness is determined by the above method and to a pair of spectacles thus obtained.

The so-called optimum thickness of an ophthalmic lens designates such a thickness which can provide a point of compromise between two requirements which are antinomic to each other. One of the two requirements is that the ophthalmic lens is to be thick enough so as not to extremely impair the strength of the ophthalmic lens to the extent that it is no more endurable for daily use, while, on the other hand, the other requirement is that the ophthalmic lens is to be as thin as possible from the viewpoint of minimization of the total weight of the ophthalmic lens. Further, the optimum thickness determined as the result of the above compromise must be such that the aesthics of a spectacle frame selected by the aesthetic sense of a spectacle wearer and the mountability of the ophthalmic lens in the selected spectacle frame can both be satisfied.

In the case of a plus ophthalmic lens in which the thickness of its central portion is larger than that of its peripheral edge portion, the ophthalmic lens is defined as having the optimum thickness above described when the thickness at its center is selected to be smallest while holding the thickness of its peripheral edge portion at a minimum value required for mounting the ophthalmic lens in a selected spectacle frame. On the other hand, in the case of a minus ophthalmic lens in which the thickness of its peripheral edge portion is larger than that of its central portion, the ophthalmic lens is defined as having the optimum thickness when the thickness of its peripheral edge portion is selected to be as small as possible.

In a prior art method used for determining the optimum thickness of a plus ophthalmic lens, the minimum thickness at the center of the lens has been determined in a manner as will be described with reference to FIG. 1. Referring to FIG. 1, the prior art method comprises finding a point $P_1$ providing a longest distance from the center A to the periphery of a spectacle frame 2, drawing a circle 1 having a radius equal to the distance $AP_1$ around the center A to assume it as a spectacle frame, and determining the thickness of the lens at the optical center OC of the lens to be optimum. Such a method will be referred to hereinafter as an ED (effective diameter) method. However, it will be apparent from FIG. 1 that, because of the great difference between the practical shape of the frame and the assumed shape of the frame, it has been almost impossible to determine the minimum thickness at the optical center OC of the lens according to the ED method.

FIG. 2 shows another prior art method which is an improvement of the ED method shown in FIG. 1. Referring to FIG. 2, an octagon formed by eight intersecting points L to S between the circle 1 and a rectangle interscribed with the spectacle frame 2 is assumed to be a spectacle frame, and the thickness at the optical center OC of the plus lens is computed on the basis of the assumed spectacle frame. This improved method is advantageous is that the hatched portions of the circle 1 are excluded in the determination of the thickness at the optical center OC of the lens. However, there is still the difference between the practical and assumed shapes of the spectacle frame, resulting in the possibility of an error. A method has been proposed recently in which in order to minimize the possibility of such an error, many angles and distances between the center A and the periphery of the spectacle frame 2 are measured, and the minimum thickness at the optical center OC of the lens is computed on the basis of the measured values. However, the proposed method has been troublesome and time-consuming because of the necessity for many times of measurement with measuring instruments and has also been disadvantageous in that the thickness value and the direction thereof can only be determined from the many results of computation.

Further, it is the present status that an ophthalmic lens is manufactured and sold in a substantially circular shape, and a spectacle shop is dealing with an ophthalmic lens manufacturer by specifying the outer diameter of the ophthalmic lens. The outer diameter, hence, the thickness at the optical center of such a circular ophthalmic lens is selected to have a large value so that the ophthalmic lens can fit any one of many kinds of spectacle frames selected by many customers who visit the spectacle shop. Therefore, when a customer selects a relatively small spectacle frame, the thickness of the ophthalmic lens mounted in the spectacle frame will be unnecessarily large. This has been disadvantageous from the aspect of the weight of the ophthalmic lens and also from the aspect of the amount of glass to be removed by cutting.

Also, as described already, it is customary in Japan that an ophthalmic lens manufacturer manufactures an ophthalmic lens which is not subjected to trimming of its peripheral edge, and such an ophthalmic lens is trimmed at its peripheral edge to be mounted in a spectacle frame selected by a customer who visits a spectacle retail shop. Therefore, the ophthalmic lens manufacturer who can determine the optimum thickness of the ophthalmic lens has not any information of the spectacle frame in which the ophthalmic lens selected by the customer is to be mounted. Thus, in the case of determination of the optimum central thickness of, for example, a plus ophthalmic lens, there have been no means other than selecting a circular lens whose optimum central thickness has a value corresponding to the thickness of the lens periphery which is not yet subjected to the edge trimming.

However, it is obvious that, since such a lens is necessarily finally subjected to the edge trimming, the optimum central thickness of the lens is desirably determined so that it attains a balance with the thickness of the peripheral edge after being trimmed. Although such a manner of determination of the optimum central thickness is found desirable, it has not yet been put into practice for the reason that the lens manufacturer who must determine the optimum central thickness of the lens has not any information pertaining to the spectacle frame desired by the customer who visited the spectacle shop.

A so-called laboratory method practiced now in the United States is one of the means for solving the problem above described. According to this laboratory method, a lens manufacturer measures the details of a spectacle frame selected by a customer to grasp the shape of the selected spectacle frame so that the optimum central thickness of the lens can be computed on the basis of the measured data. However, not only an exclusive measuring apparatus is required for the practice of the method, but also such a method does not match the actual circumstances in Japan in which an ophthalmic lens is mounted in a spectacle frame in a spectacle shop.

With a view to obviate various prior art defects as pointed out above, it is a primary object of the present invention to provide a method for determining the optimum thickness of an ophthalmic lens according to which the lens thickness optimum for the shape of a selected spectacle frame, that is, the minimum thickness at the center of the lens when the lens is a plus lens or the minimum thickness of the peripheral edge of the lens when the lens is a minus lens, can be immediately and easily determined at the time of selection of the specific spectacle frame by a spectacle wearer, thereby providing spectacles having optimum ophthalmic lenses.

The present invention will be apparent from the following detailed description taken in conjunction with the accompanying drawings, in which:

FIG. 5 is a flow chart for illustrating the operation of the computer in the embodiment of the method according to the present invention.

An embodiment of the method according to the present invention will now be described in detail with reference to FIGS. 3 to 6.

(a) Necessary information inputs including the kind of an ophthalmic lens desired by a customer (for example, a progressive power lens, a multifocal lens or a unifocal lens), the data described in a prescription by a doctor (for example, the refractive power required for myopia, astigmia or the like, the axial direction of the lens, and the pupil-to-pupil distance PD), the material of the spectacle frame selected by the customer, and the dimensions (lateral, longitudinal, nasal, etc.) of the spectacle frame, are applied to a computer installed in a spectacle retail shop.

Figure 1:
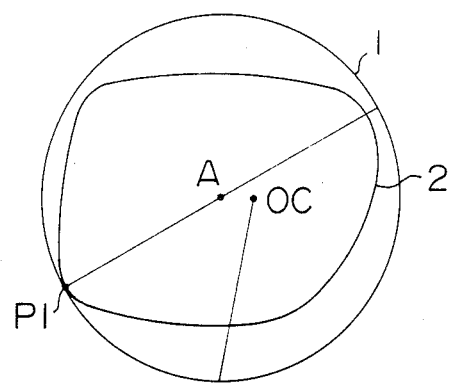
FIGS. 1 and 2 show spectacle frames and ophthalmic lenses for illustrating proir art methods used for determining the optimum thickness.
Figure 2:
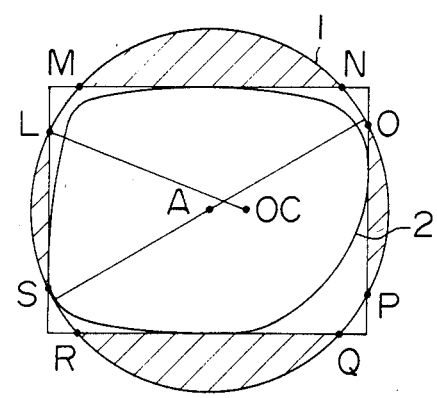
Figure 3:
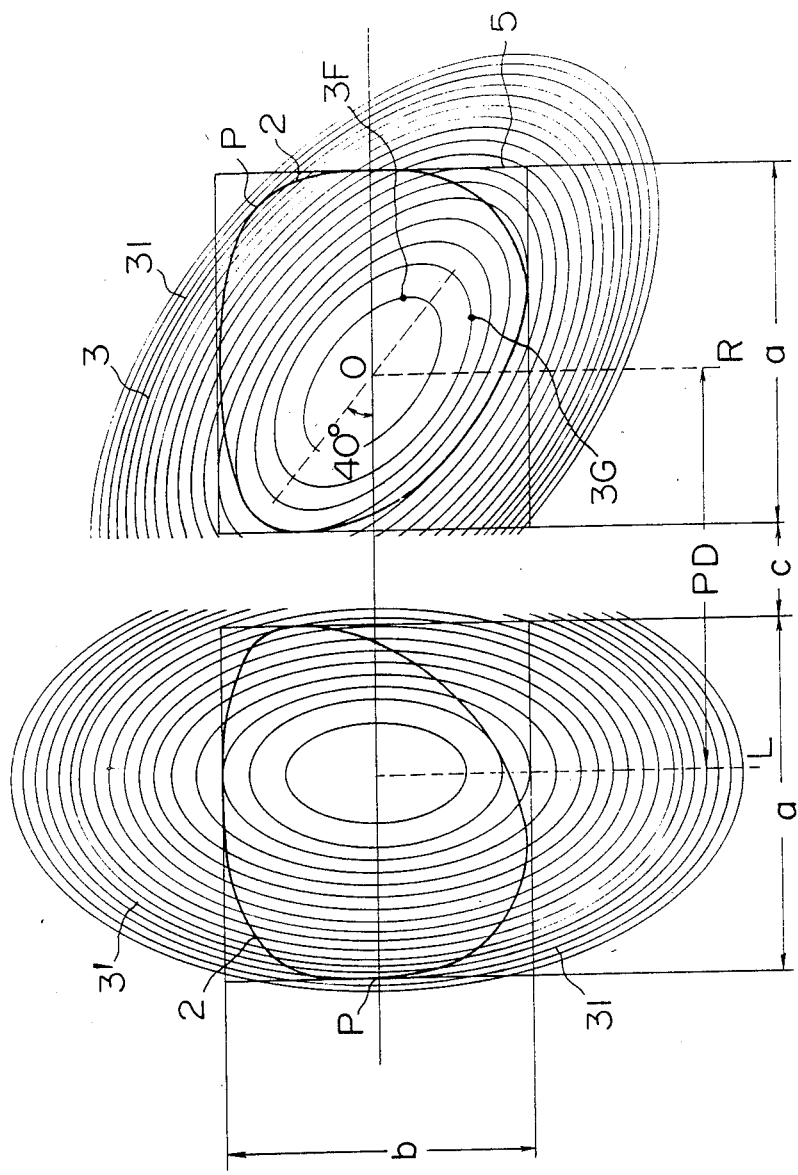
FIG. 3 shows a pattern of equi-thickness lines of ophthalmic lenses and a spectacle frame in an embodiment of the method according to the present invention.

(b) On the basis of the various information inputs above described, the computer makes necessary arithmetic operation or computation according to a predetermined program, and the results of computation by the computer are applied to a printer installed in the spectacle retail shop thereby drawing or printing out a group of equi-thickness lines 3 for each of the ophthalmic lenses on a sheet of paper. The equi-thickness line group 3 for each of the ophthalmic lenses is drawn in a pattern as shown in FIG. 3, and rectangular frames 5 (having sides a and b) indicating the outermost dimensions of the spectacle frame 2 are also drawn on the sheet in superimposed relation with the equi-thickness line groups 3 and 3'. In FIG. 3, the reference numerals 3 and 3' designate the equi-thickness line groups for the ophthalmic lenses for the right and left eyes respectively when viewed from the eyeball side. The symbol PD designates the pupil-to-pupil distance between the right and left eyeballs. Further, the symbols a and b designate the width and height respectively of the spectacle frame portions 2.

The prescribed data of the ophthalmic lenses having the equi-thickness lines shown in FIG. 3 are as follows:

Right (R): sphericity (S)+1.00, astigmia (C)+2.00, axial direction (AX) of astigmatic lens 40°, monocular PD 32.

Left (L): sphericity (S)+1.00, astigmia (C)+2.00, axial direction of astigmatic lens 90°, monocular PD 32.

The dimensions a, b and c of the spectacle frame 2 are as follows:

a: 56.0 mm,
b: 50.0 mm,
c (nasal): 16.0 mm.

In FIG. 3, the equi-thickness line groups 3 and 3' are elliptical because the ophthalmic lenses are astigmatic lenses. It is apparent that they are in the form of concentric circles in the case of ordinary spherical lenses.

It will be seen in FIG. 3 that the datum line of the spectacle frame 2 is drawn to extend through the centers of the heights b so that the position of the optical center 0 of each ophthalmic lens coincides with the position of the pupil. Although the equi-thickness line groups 3, 3' and the rectangular frames 5, 5' are drawn on a sheet of paper in FIG. 3, they may be displayed on, for example, the screen of a cathode-ray tube.

Suppose now that the equi-thickness lines of the plus lens for each of the right and left eyes have a pitch of 0.2 mm therebetween. Then, the maximum central thickness of this plus lens will be 5 mm when there are, for example, 25 equi-thickness lines.

(c) Then, the spectacle frame 2 is placed on the curves of FIG. 3 drawn in the spectacle shop in such a relation that its left and right portions are symmetrical to each other and horizontal with respect to the associated rectangular frames 5' and 5 respectively. Then, the outermost equi-thickness line 31 in each of the spectacle frame portions, that is, the equi-thickness line intersecting at a point P with each of the frame portions is read. In the case of the lens for the right eye, this equi-thickness line 31 is the 15th one counted from the innermost one.

Therefore, when the thickness of the peripheral edge of the plus lens is assumed to be zero, the thickness at the center of the plus lens is given by $0.2 \times 15 = 3.0$ mm. The value of 0.2 mm in the above expression is the pitch between the equi-thickness lines.

Actually, the thickness of the peripheral edge of a lens is set at an adequate value determined depending on, for example, the kind of the lens and the kind of the spectacle frame. When the peripheral thickness of the lens is assumed as 1.2 mm, the central thickness of the lens to be mounted in the spectacle frame is given by $3.0 + 1.2 = 4.2$ mm.

(d) Then, the outermost equi-thickness line (the line 31 passing the point P in FIG. 3) for each of the left and right lenses is read by the employee of the spectacle shop. Subsequently, the data indicative of the line numbers are applied together with the data of the prescription to the computer which is, for example, the model HIT 80 made by the Fujitsu Co. in Japan. The processed data are then transferred on-line as an order to a computer installed in the factory of the lens manufacturer.

Figure 4:
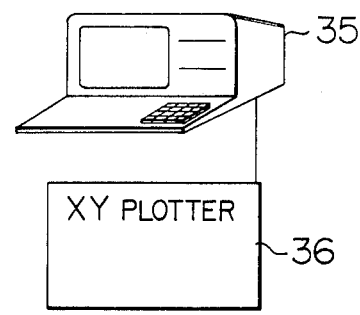
FIG. 4 is a schematic perspective view of a computer and an XY plotter used in the embodiment of the method according to the present invention.

The embodiment of the method of the present invention using a computer for data processing will now be described. FIG. 4 shows a computer 35 and an XY plotter 36 employed in the present invention. The XY plotter 36 connected to the output of the computer 35 draws the equi-thickness line groups 3 and 3' of the ophthalmic lenses shown in FIG. 3. The operation of the computer 35, under control of which the equi-thickness line groups 3 and 3' shown in FIG. 3 are drawn, will be described with reference to a flow chart shown in FIG. 5.

Figure 6:
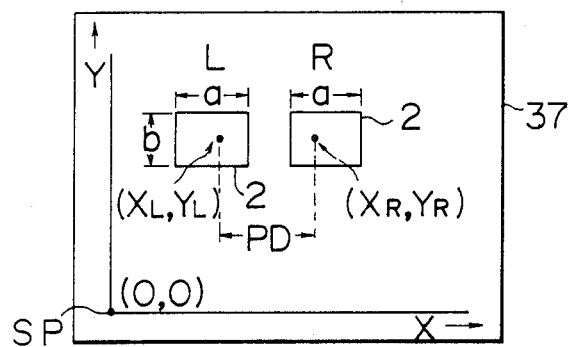
FIG. 6 is a plan view of a sheet used for determining the coordinates of the optical centers of ophthalmic lenses in the step 41 of the flow chart shown in FIG. 5.

In step 40, information inputs including the kind of lenses, the data of a prescription by an eye doctor, and the material and dimensions of a spectacle frame are applied to the computer 35 by manipulation of its keyboard, as described already. In next step 41, the coordinates of each optical center OC of the left and right lenses L and R is automatically obtained by the process of the computer 35, in accordance with the prescription data by the eye doctor and the dimension of the spectacle frame and the like which are already inputted in the step 40. Namely the coordinates $(X_R, Y_R)$ and $(X_L, Y_L)$ of each optical center OC in FIG. 6, the coordinates having the original point SP for the coordinates, are automatically obtained by the calculation of the computer 35. In next step 42, the maximum thickness $H_{max}$ at the center of each lens, that is margin to be allowable for the thickness at the center, is determined by the computer 35 in accordance with the inputted data in the step 40, especially the prescription data. The maximum thickness $H_{max}$ is obtained in such a manner that four values of the thickness of the center of the plus lens when the thickness of the peripheral edge of the lens at the corner point of the square having the dimensions of a by b shown in FIG. 6 is assumed to be zero, are calculated each four corner points of each square for left or right lens, and the maximum thickness $H_{max}$ is determined to the maximum one among the four values. In next step 43, the thickness of lens glass to one pitch $\Delta H$ of the equi-thickness line group 3 or 3' is set by the computer 35. Namely, in other words, it is set as to what thickness of the lens glass is corresponding to the interval gap between adjacent two lines of the equi-thickness line group 3 or 3' in accordance with the prescription data. The interval gap is not preferable in an excessively large or small value, but preferable in about 1 mm. In next step 44, it is set or determined by the computer 35 as to what number T of lines should be used for the equi-thickness line group 3 or 3'. The number T of lines can be easily obtained by the computer 35 in accordance with the value $H_{max}$ and the pitch $\Delta H$ which are already obtained in the steps 42 and 43 respectively. In next step 45, an initial thickness H of the lens corresponding to one equi-thickness line to be printed out at the first time is set. For example, if the initial thickness is set to 2 mm, the equi-thickness line 3F in FIG. 3 which is corresponding to the thickness 2 mm of the lens glass is at first drawn by the X-Y plotter 36. In next step 46, the coordinates of the many points on one of the equi-thickness line group 3 or 3' is obtained by the computer 35 in accordance with a predetermined program, and the coordinates of the many points have the optical center OC as an original point of the coordinate. Such calculation for obtaining the coordinates of many points on a single line is excuted each of the lines of mumber T. In next step 47, the coordinate values thus obtained in the step 46 are converted into the coordinate values in the coordinate having the original point SP in FIG. 6 as an original point. The operation of such conversion is also executed by the computer 35 in accordance with a predetermined program. In next step 48, the orthogonal coordinates obtained by the polar-orthogonal conversion are plotted to draw the first equi-thickness line which is, in this case, the equi-thickness line 3F shown in FIG. 3. In next step 49, judgment is made as to whether or not drawing of the total number T of equi-thickness lines determined already in step 44 has been completed. When the result of judgment in step 49 proves that drawing of T equi-thickness lines has not yet been completed, the step 49 is followed by step 50. In step 50, the pitch $\Delta H$ is added to the initial lens thickness H, and, then, the series of steps 45 to 48 are sequentially executed again to draw an equi-thickness line 3G next adjacent to the equi-thickness line 3F. Such a manner of drawing is repeated for each of the equi-thickness lines until the equi-thickness line group 3 shown on the right-hand side in FIG. 3 and composed of T or 17 equi-thickness lines in FIG. 3 is drawn. The equi-thickness lines in the group 3' shown on the left-hand side in FIG. 3 are entirely similarly drawn.

The information of the line number of the outermost equi-thickness line 31 in each of the equi-thickness line groups 3 and 3' drawn in the manner above described is applied as an input to the computer 35. The computer 35 computes immediately the value of the lens central thickness in response to the application of the information of the line number of the equi-thickness line 31, and an output indicative of the optimum central thickness is generated from the computer 35. Besides the data of the determined optimum central thickness, the data including those of the external diameter of the lens and the radius of curvature of the front surface of the lens are sent to the factory of the lens manufacturer. On the basis of the information thus transmitted and in consideration of the factors including the visual power of the specific spectacle wearer and the shape of the spectacle frame selected by the wearer, the lens manufacturer can prepare the ophthalmic lens having the optimum central thickness.

Although the foregoing embodiment has been described with reference to the application of the present invention to a convex lens where the thickness of its peripheral edge is smaller than that of its center, it is apparent that the representative optimum thickness of the peripheral edge of a concave lens can be entirely similarly determined.

It will be understood from the foregoing detailed description that the method according to the present invention provides the following various advantages:

(a) Ophthalmic lenses each having its optimum thickness can be obtained, and, therefore, spectacles which are light in weight and exhibit smart external appearance can be provided.

(b) There is utterly no need, for a frame department, to keep a stock of many ophthalmic lenses of various kinds each in a small lot.

(c) Desired ophthalmic lenses can be finished earlier than hitherto thereby furnishing correspondingly improved service to customers.

What is claimed is:

1. A method for determining the optimum thickness of an ophthalmic lens for a specified spectacle which comprises generating an equi-thickness line drawing of the contour of an ophthalmic lens based on a doctor's prescription for the lens, each of said equi-thickness lines being representative of a predetermined pitch and enveloping the optical center of the lens; superimposing on said drawing an outline of the frame of the spectacle in an orientation determined by the doctor's prescription; identifying the outermost equi-thickness line within the boundaries of said frame; and determining the optimum thickness of the ophthalmic lens, based on the number of equi-thickness lines between the optical center of said lens and the identified outermost equi-thickness line, inclusive.

2. The method of claim 1 wherein the optimum thickness of the opthalmic lens is determined by multiplying the number of equi-thickness lines between the optical center of the lens and the identified outermost equi-thickness line, inclusive, by the predetermined pitch, and adding to the product a predetermined minimum thickness.

3. The method of claim 1 wherein the equi-thickness line drawing is of a left and a right lens, the portion of said line drawing for each lens being oriented in accordance with the doctor's prescription, including the interpupillary distance and axial direction, and wherein an outline of the left and right frames of the spectacle are superimposed, respectively, over the left and right portions of the equi-thickness line drawing based on the doctor's prescription; and wherein the optimum thickness for each ophthalmic lens is determined independently.

4. A method of selecting spectacles for which an ophthalmic lens has an optimum thickness for a given prescription, which comprises applying the method described in claim 1 to a plurality of spectacles.

* * * * *